United States Patent [19]

Miyashita et al.

[11] Patent Number: 4,533,969

[45] Date of Patent: Aug. 6, 1985

[54] TAPE CASSETTE ANTI-STATIC MEMBER

[75] Inventors: Takao Miyashita; Toshio Sato, both of Kanagawa, Japan

[73] Assignee: Sony Corporation, Tokyo, Japan

[21] Appl. No.: 463,807

[22] Filed: Feb. 4, 1983

[30] Foreign Application Priority Data

Feb. 5, 1982 [JP] Japan ............................ 57-15088[U]

[51] Int. Cl.[3] ........................ G11B 23/02; G11B 23/04

[52] U.S. Cl. .................................... 360/132; 242/199; 360/137

[58] Field of Search ............... 360/132, 135, 137, 128, 360/97, 98, 99, 86, 96; 242/197, 198, 199, 200

[56] References Cited

U.S. PATENT DOCUMENTS 4,251,843 2/1981 Masuyama .......................... 360/137
4,337,909 7/1982 Harja .................................. 242/199
4,345,284 8/1982 Saito .................................. 360/132
4,347,537 8/1962 Schoettle ........................... 242/197

*Primary Examiner*—Robert M. Kilgore
*Attorney, Agent, or Firm*—Lewis H. Eslinger; Alvin Sinderbrand

[57] ABSTRACT

A tape cassette incorporates an anti-static member that dissipates static electricity on the tape as it runs. The anti-static member comprises an electrically conductive strip that flexibly engages the edges of the coils of tape wound on reels inside the cassette housing. A tab integral with the strip extends into a locating hole of the cassette housing for engagement with a conductive locating pin on the apparatus using the cassette when the cassette is installed. The tab provides a grounding means that completes the connection of the tape to ground and prevents the build-up of static electricity on the tape as it rubs itself and the cassette guiding elements while it is running.

6 Claims, 10 Drawing Figures

FIG. 3
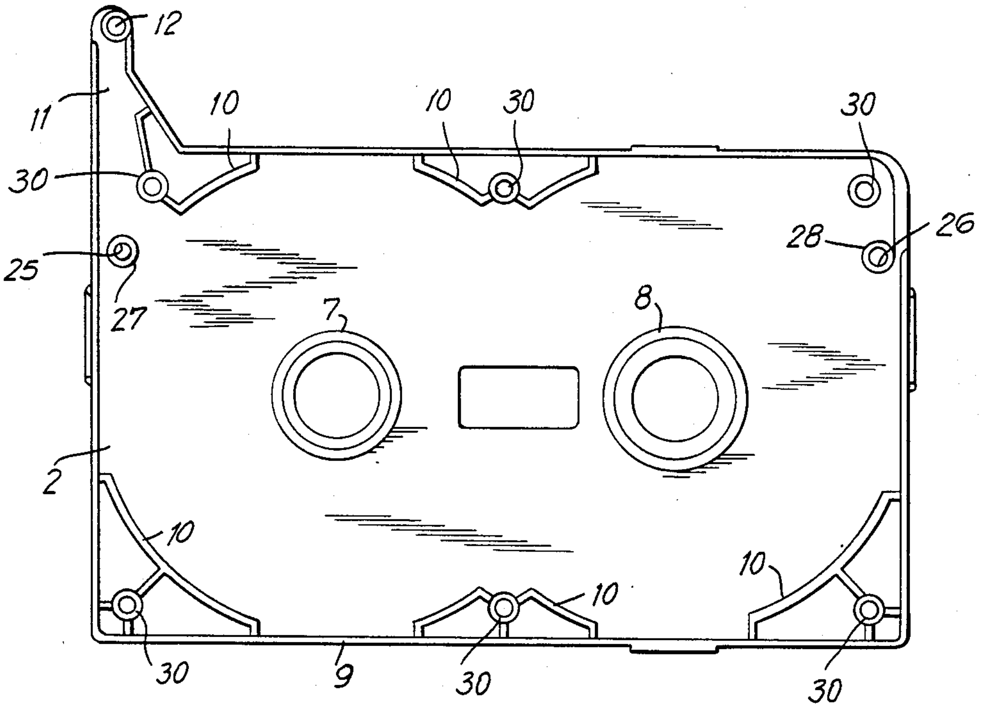
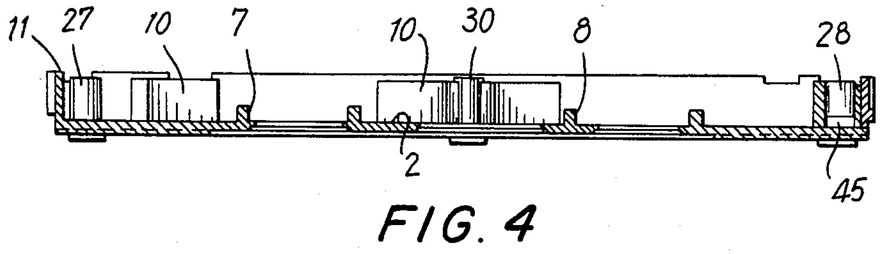
FIG. 4

FIG. 5
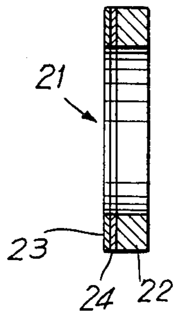
FIG. 6
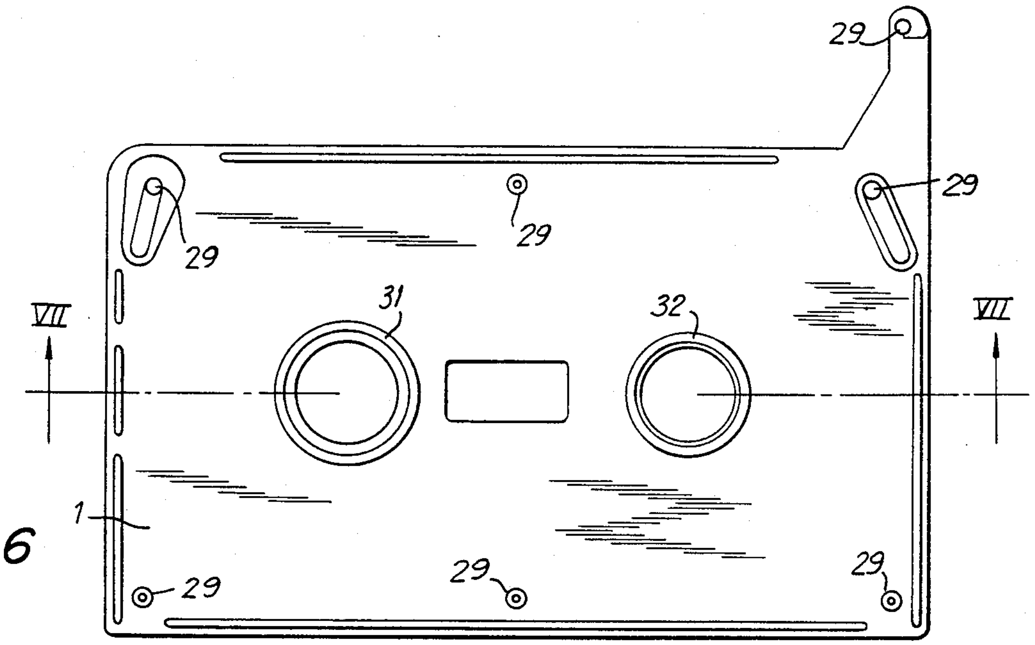
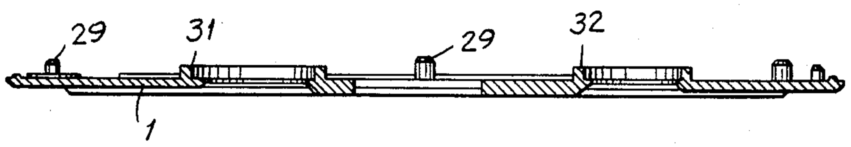
FIG. 7

TAPE CASSETTE ANTI-STATIC MEMBER

BACKGROUND OF THE INVENTION

1. Field of the Invention

This invention relates to tape cassettes and, more particularly to tape cassettes having means for preventing a static charge from building up on the tape.

2. Description of the Prior Art

Many kinds of apparatus use a tape wound on reels in a cassette housing. Most cassette housings are made of plastic or other synthetic materials, as are the tapes. As the reels turn in the cassette housing, the tape rubs against itself and parts of the cassette, which causes a static charge to build up on the tape. The static electricity causes it to cling to itself and to the cassette housing and guide elements, which can cause tape misfeeds and malfunctions of the apparatus because of the resulting resistance to tape feeding.

Apparatus that prints information by transfer of pigment from the tape with a thermal printing head is particularly susceptible to the build-up of static electricity on the tape. The section of tape running through the therml printer typically does not contact any electrically conductive structure, so the static electricity on the tape is not dissipated as the tape runs. The same problem exists with any apparatus that does not afford an opportunity to dissipate the static charge on the tape.

OBJECTS AND SUMMARY OF THE INVENTION

Accordingly, it is an object of this invention to provide a tape cassette that avoids the above-mentioned difficulties encountered with prior art cassettes.

More particularly, it is an object of this invention to provide a tape cassette with anti-static means that prevents the build-up of static electricity when the tape is running.

To accomplish those and other objects of the invention, a tape cassette comprises a housing, at least one coil of tape rotatably mounted in the housing, and an anti-static means which includes conductive means in contact with the tape in the housing and grounding means for connecting the conductive means to ground outside the housing.

In one embodiment of the invention, the cassette housing has a locating hole for cooperating with a conductive locating pin on an apparatus that accepts the cassette to correctly position the cassette in the apparatus, a pair of tape reels rotatably mount two coils of tape in substantially co-planar, side-by-side relation within the housing, the conductive means comprises a strip of conductive sheet material located between the tape coils and the inner surface of the cassette housing and contacting at least one edge of the tape on the coils, and the grounding means includes a tab on the strip that extends into the locating hole for contacting the conductive locating pin when the cassette is installed in the apparatus.

BRIEF DESCRIPTION OF THE DRAWINGS

FIG. 3 is a plan view of the base portion of the housing of the tape cassette shown in FIG. 1;

FIG. 4 is a sectional view taken along the line III—III in FIG. 3;

FIG. 5 is a sectional view of an anti-friction bearing used in the tape cassette shown in FIG. 1;

FIG. 6 is a plan view of the cover portion of the housing of the tape cassette shown in FIG. 1;

FIG. 7 is a sectional view of the cover portion taken along the lines VII—VII on FIG. 6;

DETAILED DESCRIPTION OF A PREFERRED EMBODIMENT

Figure 2:
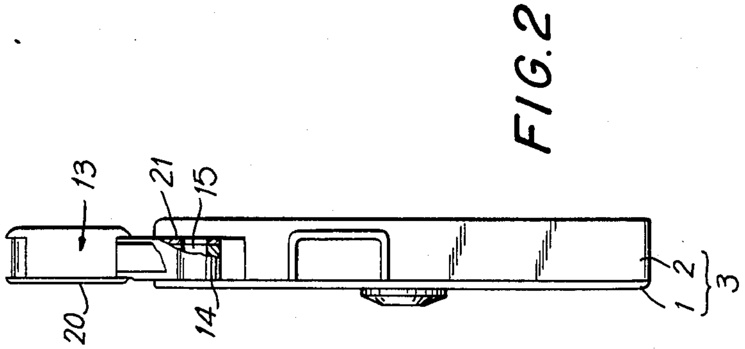
FIG. 2 is a side elevational view, partly in section, of the tape cassette shown in FIG. 1.
Figure 1:
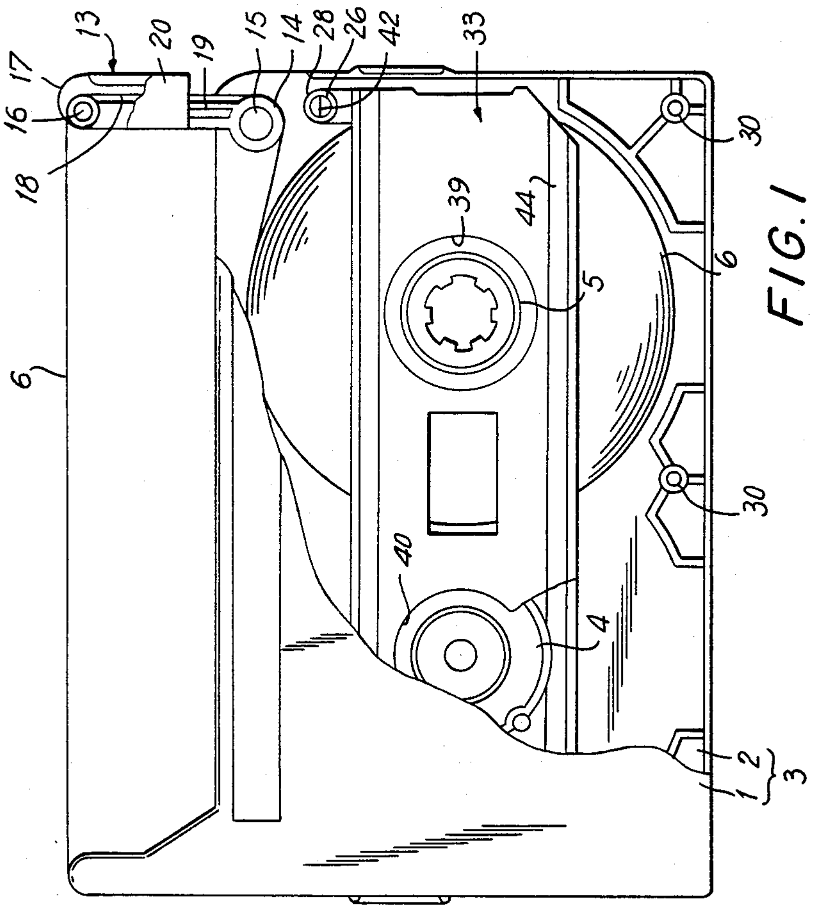
FIG. 1 is a plan view, partly broken away and in section, of a tape cassette in accordance with an embodiment of the present invention.

Referring to the drawings in detail, and initially to FIGS. 1 and 2, a tape cassette suitable for use with a thermal printing apparatus, and in which the present invention is desirably embodied, is there shown to include a cover 1 and a base 2 that are assembled together to form a cassette housing 3. A tape take-up reel 4 and a tape supply reel 5 are rotatably mounted in housing 3. A tape 6 is wound around both reels in two co-planar, side-by-side coils. The tape 6 is made of a suitable synthetic resin with a pigment on its surface.

FIGS. 3 and 4 show the housing base 2 in more detail. The base 2 includes two cylindrical projections 7 and 8 for rotatably guiding reels 4 and 5, and a side wall that substantially circumscribes the base 2. The base 2 also includes a plurality of curved members 10 and a guide member 11. A take-up side guide pin 12 is located at the end of the guide member 11.

As shown in FIGS. 1 and 2, the cassette also includes an arm 13 that has at one end a boss 14 with a cylindrical outer surface. The boss 14 has a bore through it that accepts a pivot pin 15 on the housing base to mount the arm 13 for pivoting relative to the cassette housing. A supply-side guide pin 16 is mounted at the outer end 17 of the arm 13. From the outer end 17 of the arm 13 a tape guide channel 18 extends to an inner portion 19 of the arm 13. A low-friction bearing 21 is provided on pin 15 between boss 14 and base 2 (FIG. 2) and ensures smooth rotation of the arm 13 on the pivot pin 15. As shown on FIG. 5, bearing 21 comprises a base ring member 22, typically made of urethane foam, and a low-friction washer 23, typically formed of polyethylene sheet material with a thin graphite film, and being secured to ring member 22 by a layer of adhesive 24.

The tape 6 extends from the supply reel 5, over the outside surface of the boss 14, through the guide channel 18 covered by a cover 20, over the supply-side guide pin 16, over the take-up side guide pin 12 on the guide member 11, and into the cassette housing to the take-up reel 4. The function of the rotatable arm 13 is described in detail in U.S. patent application Ser. No. 329,700, filed Dec. 11, 1981, and having a common assignee herewith. In the illustrated embodiment of the invention, the tape 6 is to be used in a thermal printing apparatus. The length of tape outside the cassette housing 3 passes through a thermal printing head that has elements for selectively applying heat to the tape. The tape carries a pigment layer that transfers pigment to a sheet in the printing apparatus when heat is applied to the tape by the printing head. By controlling the pattern of the heat applied to the tape, characters, pictures or other information can be transferred to a suitable sheet in the apparatus. The above-mentioned United States patent application describes such a thermal printing apparatus in more detail.

Figure 1A:
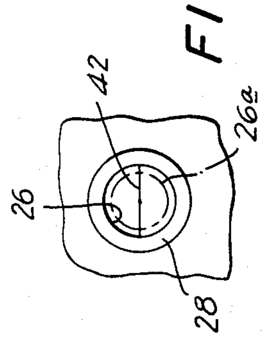
FIG. 1A is a detailed view of the grounding means of the tape cassette shown in FIG. 1.

As shown in FIG. 3, the housing base 2 of a cassette useful with a thermal printing apparatus has a pair of locating holes 25 and 26 passing through the base. Cylindrical projections 27 and 28 extend around the define the holes 25 and 26, respectively. Pins from the printing apparatus extend through the holes 25 and 26 to locate the cassette precisely when it is installed in the printing apparatus. FIG. 1A illustrates how one of the locating pins of the printing apparatus shown in dot-dash lines and indicated at 26*a* fits into the locating hole 26.

FIGS. 6 and 7 show the housing cover 1 for the tape cassette. The cover 1 has a plurality of assembly pins 29 projecting therefrom at spaced locations around its periphery, and that fit into assembly sockets 30 similarly located in base 2 to ensure proper assembly of the cassette housing. The cover 1 includes two cylindrical projections 31 and 32 that, with the respective cylindrical projections 8 and 7 on the base 2, are operative to rotatably guide the tape reels 5 and 4, respectively.

In thermal printing apparatus, the tape does not typically contact any electrically conductive structure while in use. The rubbing of the tape against itself as it feeds from the returns to the coils around the tape reels, against the cassette parts, such as the various tape guiding elements, and against the printer parts, can cause a considerable static charge to build up on the tape. That charge can interfere with the operation of the cassette and printer and cause malfunctions.

The cassette embodying the present invention solves that problem by incorporating anti-static means into the cassette. In the illustrated embodiment, the anti-static means comprises an electrically conductive strip 33 that contacts the edges of the tape 6 while the latter is coiled around the reels 5 and 6. Conveniently, the conductive strip 33 may be made of polethylene sheet material coated with graphite.

Figure 8:
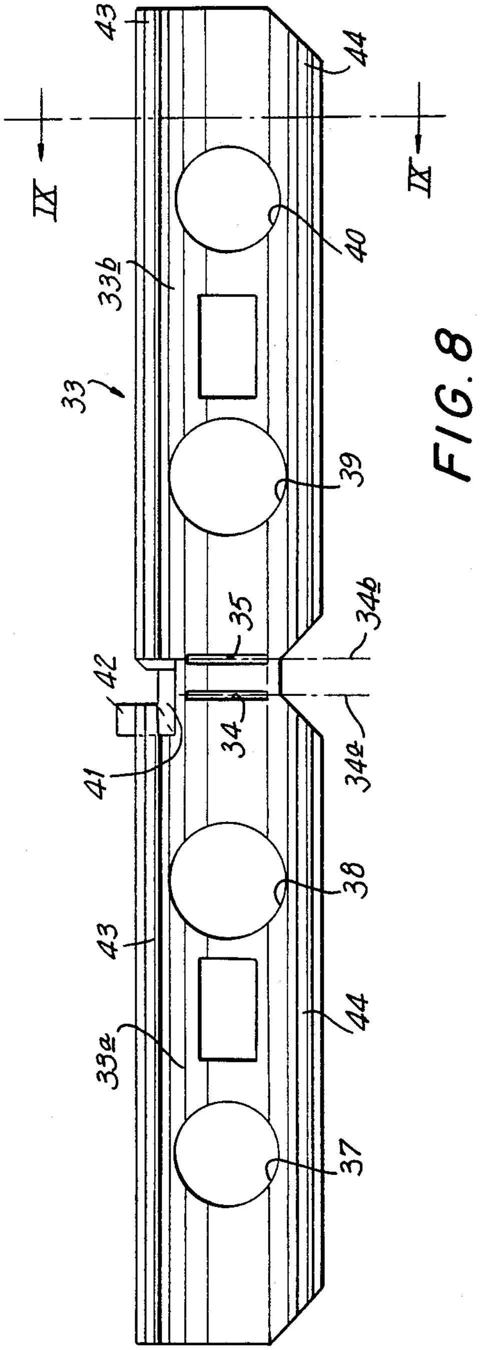
FIG. 8 shows a strip of conductive sheet material that constitutes anti-static means in the cassette of FIG. 1 according to an embodiment of the present invention.
Figure 9:
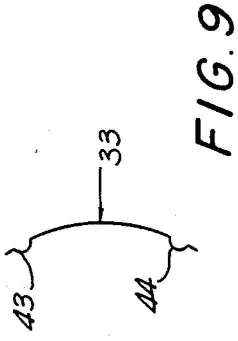
FIG. 9 is a sectional view of the anti-static strip as viewed along the line IX—IX in FIG. 8.

FIGS. 8 and 9 show the elongated strip 33 before it is installed in the cassette. The strip is bowed in cross-section, as best seen in FIG. 9. Near the middle of its length, the strip 33 has two slits or perforations 34 and 35 that weaken it somewhat to define parallel bend lines 34*a* and 35*a*. Such bend lines divide strip 33 into two major portions 33*a* and 33*b*. Circular holes 37,38,39 and 40 are suitably located and of sufficiently large diameter to enable the cylindrical projections 7,8,31 and 32 to pass through them. A struck portion 41 is located at an edge of the mid-portion of strip 33 to provide a tab 42 (shown in phantom in FIG. 8) when the struck portion 41 is bent out along a 45° bend line. Beads 43 and 44 are formed along the longitudinal edges of strip 33 and are concave in the direction opposed to the concavity of the control portion of the strip.

The strip 33 fits in the cassette as shown in FIG. 1. Strip portion 33*a* is disposed in base 2 with holes 37 and 38 receiving cylindrical projections 7 and 8, respectively, on the cassette base 2. The tab 42 fits through a slot 45 in the cylindrical projection 28 (see FIG. 4) and protrudes slightly into the locating hole 26, as shown on FIGS. 1 and 1A. After the reels 4 and 5 with the tape 6 wound thereon have been located by cylindrical projections 7 and 8, strip 33 is folded at slits 34 and 35 to bring the other portion 33*b* of the strip 33 generally parallel to the strip portion 33*a* on the housing base 2 whereupon the cover 1 can be assembled to the base 2. When the strip is bent at the slits 34 and 35 and cover 1 is assembled on base 2, cylindrical projections 31 and 32 enter the holes 39 and 40, respectively, in strip portion 33*b*. The distance between slits 34 and 35 is chosen to provide a spacing between the two portions 31*a* and 31*b* of the strip 33 when it is folded that is suitable for the width of the tape 6.

The beads 43 and 44 along the edges of strip 33 are thus in contact with the edges of the tape 6 on the reels 4 and 5. The convex surface of the strip 33 between beads 43 and 44 bears against the inside surfaces of the cover 1 and base 2 to flex between the tape and the inside of the cassette housing. The beads 43 and 44 comprise slide means that permit the tape to slide smoothly relative to the edges of the strip 33, which flexes during tape supply and take-up by the reels to maintain the beads in contact with the tape. The tab 42 extending from strip 33 into hole 26 provides a grounding means for connecting the conductive strip 33 to ground when the cassette is installed in the printing apparatus. More particularly, locating pin 26*a* on the printing apparatus, which enters the hole 26 to locate the cassette properly when it is installed in such apparatus (see FIG. 1A) is grounded. It connects the strip 33 to ground through the tab 42. Thus, a conductive path is provided from the tape 6 to ground and static build-up is prevented.

In the above-described embodiment of the invention, the strip 33 is formed in one piece and then bent double. The anti-static means of the present invention could also be formed of two sheets or strips each having a tab that extends into the locating hole 26. The sheet could also be made of other conductive materials, such as a foil laminate, for example. In addition, the present invention can also be incorporated into cassettes used for applications other than in thermal printers.

Having described specific preferred embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tape cassette comprising a housing having a locating hole for cooperating with a grounded conductive locating pin in an apparatus that accepts the cassette to correctly position said cassette in said apparatus; a pair of tape reels rotatably mounting two coils of tape in substantially co-planar, side-by-side relation in said housing with a substantial portion of the tape edge exposed; and anti-static means including a strip of conductive sheet material spanning substantially the entire diameters of both coils of tape and being curved in transverse cross-section for flexure of said strip between the tape coils and the inside surface of said housing, said strip having two portions folded into mutually facing relation to embrace said tape coils and bear against opposite edges of said tape therein, each said portion of the strip including slide means for slidably engaging the edges of the tape coils, and grounding means including a tab on said strip extending into said locating hole for contacting the conductive locating pin when the cassette is installed in the apparatus and thereby connecting said strip to ground outside said housing, said tab being integral with one of said portions and being constituted by a bent portion of said strip extending transversely therefrom.

2. A tape cassette as in claim 1; for use with a thermal printing apparatus, and wherein said tape coils comprise a tape having a pigment layer for the transfer of pigment therefrom to a sheet when heat and pressure are selectively applied to the tape by a printing head in the printing apparatus.

3. A tape cassette comprising a housing having a locating hole for cooperating with a grounded conductive locating pin in an apparatus that accepts the cassette to correctly position said cassette in said apparatus; a pair of tape reels rotatably mounting two coils of tape in substantially co-planar, side-by-side relation in said housing with a substantial portion of the tape edge exposed; said housing including a base and a cover, each having two cylindrical projections thereon that cooperate when said base and cover are assembled to rotatably guide said tape reels holding said tape coils; and anti-static means including a strip of conductive sheet material spanning substantially the entire diameters of both coils of tape and being curved in transverse cross-section for flexure of said strip between the tape coils and the inside surface of said housing, said strip having two portions folded into mutually facing relation to embrace said tape coils and bear against opposite edges of said tape therein, each said portion of the strip including slide means for slidably engaging the edges of the tape coils, said strip further having holes therein that fit over said cylindrical projections to locate said strip in said housing, and grounding means including a tab on said strip extending into said locating hole for contacting the conductive locating pin when the cassette is installed in the apparatus and thereby connecting said strip to ground outside said housing.

4. A tape cassette comprising a housing with opposed walls having a locating hole for cooperating with a grounded conductive locating pin in an apparatus that accepts the cassette to correctly position said cassette in said apparatus; at least one coil of tape rotatable on a reel in said housing with opposed edges of the tape in said coil confronting said opposed walls; and anti-static means including an elongated strip of conductive sheet material folded to provide two elongated portions in mutually facing relation which embrace said tape coil across substantially the entire diameter thereof, each of said portions of the strip being curved in transverse cross-section for flexure between the adjacent one of said walls and the confronting edges of the tape coil which are thereby reliably contacted, and a tab of said conductive sheet material extending integrally from said strip into said locating hole for contacting the conductive locating pin when the cassette is installed in said apparatus and thereby connecting said strip to ground outside said housing.

5. A tape cassette according to claim 4; wherein each of said portions of the strip has beads extending along opposed longitudinal edges of the strip portions for sliding engagement with said edges of the tape coil.

6. A tape cassette according to claim 4; in which said strip has an intermediate portion between said elongated portions, said tab being struck from said intermediate portion at one side of the latter and then folded away from said one side about an oblique fold line so as to extend transversely from one of said elongated portions of the strip.

* * * * *